(12) United States Patent
Mata et al.

(10) Patent No.: US 10,654,592 B2
(45) Date of Patent: May 19, 2020

(54) INTEGRATION OF FUEL CELL WITH CRYOGENIC SOURCE FOR COOLING AND REACTANT

(71) Applicant: THE BOEING COMPANY, Chicago, IL (US)

(72) Inventors: Marianne E. Mata, Chicago, IL (US);
Martin E. Lozano, Chicago, IL (US);
Tyler C. Staudinger, Chicago, IL (US);
John H. Blumer, Chicago, IL (US);
Mark W. Henley, Chicago, IL (US)

(73) Assignee: The Boeing Company, Chicago, IL (US)

( * ) Notice: Subject to any disclaimer, the term of this patent is extended or adjusted under 35 U.S.C. 154(b) by 817 days.

(21) Appl. No.: 15/043,437

(22) Filed: Feb. 12, 2016

(65) Prior Publication Data
US 2017/0233111 A1    Aug. 17, 2017

(51) Int. Cl.
*B64G 1/42* (2006.01)
*H01M 8/04014* (2016.01)
(Continued)

(52) U.S. Cl.
CPC ............ *B64G 1/42* (2013.01); *B64D 27/24* (2013.01); *B64G 1/402* (2013.01);
(Continued)

(58) Field of Classification Search
CPC ....... B64G 1/42; B64G 1/402; H01M 8/1007; H01M 8/04014; H01M 8/04208;
(Continued)

(56) References Cited

U.S. PATENT DOCUMENTS

| 3,748,180 A | * | 7/1973 | Clausi ..................... H01M 8/04 429/414 |
| 3,823,038 A | * | 7/1974 | Gidaspow ............... H01M 8/00 429/410 |

(Continued)

OTHER PUBLICATIONS

Valentian et al, Low Cost Cryogenic Propulsion Module for Scientific and Commercial Missions, Jul. 2007, AIAA (Year: 2007).*

(Continued)

*Primary Examiner* — Medhat Badawi
*Assistant Examiner* — Vicente Rodriguez
(74) *Attorney, Agent, or Firm* — Haynes and Boone LLP (57) ABSTRACT

A fuel cell-based power system comprises a fuel cell configured for continuously receiving a first reactant and a second reactant to produce chemical reactions that generate electrical power, water, and heat, a coolant subsystem configured for circulating a primary coolant in association with the fuel cell, thereby absorbing the generated heat, a tank configured for storing a reactant, and a reactant distribution subsystem configured for conveying the reactant from the tank to an independent system, the fuel cell as the first reactant, and the coolant subsystem as a secondary coolant to remove the absorbed heat from the primary coolant and/or a water accumulator. The secondary coolant may be conveyed to a gas thruster as a gas after the absorbed heat has been removed from the secondary coolant. The reactant may be boil off of a cryogenic liquid or vapor or gas transformed from a cryogenic liquid via a heater.

20 Claims, 3 Drawing Sheets

(51) Int. Cl.
*H01M 8/04082* (2016.01)
*H01M 8/04701* (2016.01)
*B64G 1/40* (2006.01)
*B64D 27/24* (2006.01)

(52) U.S. Cl.
CPC ... *H01M 8/04014* (2013.01); *H01M 8/04208* (2013.01); *H01M 8/04701* (2013.01); *H01M 2250/20* (2013.01); *Y02T 50/44* (2013.01); *Y02T 50/62* (2013.01); *Y02T 90/32* (2013.01)

(58) Field of Classification Search
CPC .......... H01M 8/1004; H01M 8/04701; H01M 2300/0082; H01M 2008/1095; H01M 250/20; H01M 8/4029; B64D 27/24
See application file for complete search history.

(56) References Cited

U.S. PATENT DOCUMENTS 4,249,387 A * 2/1981 Crowley ................ F25J 1/0025
62/48.2
2015/0337763 A1* 11/2015 Vuillamy .................. F02K 9/46
60/221

OTHER PUBLICATIONS

Shaw et al, Hydrogen-Oxygen fuel cell system for space vehicles, Sep. 1962, AIAA (Year: 1962).*

* cited by examiner

INTEGRATION OF FUEL CELL WITH CRYOGENIC SOURCE FOR COOLING AND REACTANT

GOVERNMENT LICENSE RIGHTS

This invention was made with Government support under contract number NNM07AB03C awarded by NASA. The U.S. Government has certain rights in this invention.

FIELD

The present disclosure relates to fuel cells for structures, such as aircraft and spacecraft.

BACKGROUND

Spacecraft require power for electronics necessary for performing the vital functions on the spacecraft. This power is typically supplied by solar arrays, batteries, and/or fuel cells. Of particular interest to the present inventions is a fuel cell, which can be described as a device that converts chemical energy from a fuel into electricity through chemical reactions of reactants consisting of a positively charged chemical element, such as hydrogen, and an oxidizing chemical element, such as oxygen. As long as the reactants are continually input into the fuel cell, a continuous source of electrical power is output from the fuel cell. Along with electrical power, water and heat are produced from the reaction of the hydrogen and oxygen in the fuel cell. To ensure that the fuel cell does not over heat, a fuel cell coolant subsystem may be used to remove the waste heat from the fuel cell. Typically, in lower temperature fuel cells, this coolant subsystem comprises a coolant loop system that circulates a coolant through the fuel cell to absorb the waste heat from the cell stack, and a radiator that transfers the heat from the coolant into the ambient environment. Typically, in higher temperature fuel cell systems, the fuel cell stack is cooled by additional reactant flow through the fuel cell stack, which can then be exhausted or cooled through a heat exchanger and then recirculated back to the fuel cell.

In typical spacecraft, the main propulsion system and power systems are separate and operationally isolated from each other. For example, the space shuttle utilizes a fuel cell-based power system in which liquid hydrogen and liquid oxygen are supplied to the fuel cell from different tanks as those that supply liquid hydrogen and liquid oxygen to the thrusters of the main propulsion system. Main propulsion cryogenic propellants, in particular liquid hydrogen, have a propensity to absorb heat while the vehicle is operating during orbital coast or loiter. Because of this heat absorption, the liquid hydrogen will boil off and must be vented overboard into the external environment in order to control the pressure within the tank. The vented hydrogen gas or vapor can be considered a necessary waste to ensure that the pressure within the main propulsion tank remains within operational limits. Once placed in orbit, spacecraft require occasional positional altitude and orientation adjustments, and thus, utilize a set of small thrusters that typically provide thrust by expelling gas via gas thrusters or reactant thrusters into the ambient environment. This requires an additional source of fuel or reactant.

Significantly, it is very important that the power system of spacecraft, be as light-weight as possible and used most efficiently due to the launching cost and/or payload considerations. However, the additional tanks, and reactant stored therein, that are used for the fuel cell-based power system and positioning thrusters, as well as the relatively large radiator used to remove waste heat from the fuel cell, disadvantageously add weight to the spacecraft.

As such, there is a need to decrease the weight of spacecraft that utilize fuel cell-based power systems.

SUMMARY

In accordance with one aspect of the present inventions, a fuel cell-based power system comprises a fuel cell configured for continuously receiving a first reactant (e.g., gaseous hydrogen) and a second reactant (e.g., gaseous oxygen) to produce chemical reactions that generate electrical power, water, and heat. The fuel cell-based power system further comprises a coolant subsystem configured for circulating a primary coolant in association with the fuel cell, thereby absorbing at least a portion of the generated heat from the fuel cell.

The fuel cell-based power system further comprises a tank configured for storing a reactant, and a reactant distribution subsystem configured for conveying the reactant from the tank to an independent system and one or both of the fuel cell as the first reactant, and the coolant subsystem as a secondary coolant to remove at least a portion of the absorbed heat from the primary coolant. The independent system is configured for performing a function using the reactant from the tank, the function being different from electrical power generation function or a cooling function.

In one embodiment, the reactant stored in the tank is a cryogenic liquid (e.g., liquid hydrogen), in which case, the reactant distribution subsystem may be configured for receiving boil off of the cryogenic liquid directly from the tank. In this case, the tank may optionally be a main tank, and the fuel cell-based power system may further comprise an auxiliary tank configured for storing a gaseous reactant. The reactant distribution subsystem may be configured for selectively conveying the boiled off reactant from the main tank to the fuel cell as the first reactant or the gaseous reactant from the auxiliary tank to the fuel cell as the first reactant.

In another embodiment, the fuel cell-based power system further comprises a heater or heat exchanger configured for thermally transforming the cryogenic liquid (e.g., liquid oxygen) from the tank into a vapor or gas. In this case, the tank may optionally be a main tank, and the fuel cell-based power system may further comprise an auxiliary tank configured for storing a gaseous reactant. The reactant distribution subsystem may be configured for selectively conveying the vapor or gas from the heater or heat exchanger to the fuel cell as the second reactant or the gaseous reactant from the auxiliary tank to the fuel cell as the second reactant.

The fuel cell-based power system and independent system may be contained with a structural bus of a spacecraft or aircraft to supply power to electronics contained within the structural bus. In this case, the independent system may be a main propulsion system or a positioning propulsion system. In one embodiment, the reactant distribution subsystem is configured for conveying the stored reactant to the coolant subsystem to remove the at least portion of the absorbed heat from the coolant. The spacecraft or aircraft may further comprise a thruster, in which case, the reactant distribution subsystem may convey the stored reactant to the thruster after the at least portion of the absorbed heat has been removed from the secondary coolant.

In accordance with a second aspect of the present inventions, a fuel cell-based power system comprises a fuel cell configured for continuously receiving a first reactant (e.g., gaseous hydrogen) and a second reactant (e.g., gaseous oxygen) to produce chemical reactions that generate electrical power, water, and heat. The fuel cell-based power system further comprises a coolant subsystem configured for circulating a primary coolant in association with the fuel cell, thereby absorbing at least a portion of the generated heat from the fuel cell. In one embodiment, the coolant subsystem comprises a coolant loop configured for circulating the primary coolant through the fuel cell, and a heat exchanger configured for removing the at least portion of the absorbed heat from the primary coolant and injecting the at least portion of the absorbed heat into a secondary coolant.

The fuel cell-based power system further comprises a tank configured for storing the reactant. The fuel cell-based power system further comprises a reactant distribution subsystem configured for conveying the reactant from the tank to the fuel cell as the first reactant, and further conveying the reactant from the tank to the coolant subsystem as the secondary coolant to remove at least a portion of the absorbed heat from the primary coolant. In one embodiment, the reactant stored in the tank is a cryogenic liquid (e.g., liquid hydrogen), in which case, the reactant distribution subsystem may be configured for receiving boil off of the cryogenic liquid directly from the tank.

The fuel cell-based power system may be contained with a structural bus of a spacecraft or aircraft to supply power to electronics contained within the structural bus. In one embodiment, the reactant distribution subsystem is configured for conveying the reactant from the tank to the coolant subsystem to remove the at least portion of the absorbed heat from the primary coolant. The spacecraft or aircraft further comprises a thruster, in which case, the reactant distribution subsystem conveys the secondary coolant to the thruster after the at least portion of the absorbed heat has been removed from the secondary coolant.

In accordance with a third aspect of the present inventions, a spacecraft or aircraft comprises a fuel cell configured for continuously receiving a first reactant (e.g., a gaseous hydrogen) and a second reactant (e.g., a gaseous oxygen) to produce chemical reactions that generate electrical power, water, and heat, and electronics that are supplied with the power generated by the fuel cell. The spacecraft or aircraft further comprises a coolant subsystem configured for circulating a primary coolant in association with the fuel cell, thereby absorbing at least a portion of the generated heat from the fuel cell. In one embodiment, the spacecraft or aircraft further comprises a heat exchanger configured for removing the at least portion of the absorbed heat from the primary coolant and injecting the at least portion of the absorbed heat into the secondary coolant.

The spacecraft or aircraft further comprises a tank configured for storing a secondary coolant, a thruster, and a distribution subsystem configured for conveying the secondary coolant from the tank to the coolant subsystem to remove at least a portion of the absorbed heat from the coolant, and conveying the secondary coolant to the thruster after the at least portion of the absorbed heat has been removed from the coolant. In one embodiment, the secondary coolant stored in the tank is a cryogenic liquid (e.g., liquid hydrogen). In this case, the reactant distribution subsystem may be configured for receiving boil off of the cryogenic liquid directly from the tank. The thruster may be, e.g., a gas thruster, in which case, the secondary coolant may be conveyed to the gas thruster as a gas. Or the thruster may be, e.g., a bi-propellant thruster, in which case, the secondary coolant may be hydrogen, and the distribution subsystem may be further configured for conveying oxygen to the bi-propellant thruster.

In accordance with a fourth aspect of the present inventions, a fuel cell-based power system comprises a fuel cell configured for continuously receiving a first reactant and a second reactant to produce chemical reactions that generate electrical power, water, and heat. The fuel cell-based power system further comprises a tank configured for storing a cryogenic liquid (e.g., liquid hydrogen or liquid oxygen). The fuel cell-based power system further comprises a heater or heat exchanger configured for thermally transforming the cryogenic liquid from the tank into a vapor or gas, and a reactant distribution subsystem configured for conveying the vapor or gas to the fuel cell as the second reactant.

The fuel cell-based power system may be contained with a structural bus of a spacecraft or aircraft to supply power to electronics contained within the structural bus. In one embodiment, the spacecraft or aircraft further comprises a thruster, in which case, the reactant distribution subsystem is configured for conveying the vapor or gas to the thruster. The thruster may be, e.g., a gas thruster or a bi-propellant combustion thruster, in which case, the reactant distribution subsystem may be configured for additionally conveying the first reactant to the bi-propellant combustion thruster. In another embodiment, the spacecraft or aircraft further comprises another tank configured for storing another cryogenic liquid, in which case, the reactant distribution subsystem may be configured for receiving boil off of the other cryogenic liquid directly from the other tank, and conveying the boiled off reactant to the fuel cell as the first reactant, and to the bi-propellant combustion thruster.

In accordance with a fifth aspect of the present inventions, a spacecraft or aircraft comprises a fuel cell configured for continuously receiving a first reactant (e.g., gaseous hydrogen) and a second reactant (e.g., gaseous oxygen) to produce chemical reactions that generate electrical power, water, and heat, and electronics that are supplied with the power generated by the fuel cell. The spacecraft or aircraft further comprises a tank configured for storing a coolant, a water accumulator configured for storing the water generated by the fuel cell, and a heat exchanger configured for removing heat from the accumulated water and injecting the at least portion of the absorbed heat into the coolant. In one embodiment, the heat exchanger is configured for removing heat from the accumulated water, thereby freezing the accumulated water.

The spacecraft or aircraft further comprises a thruster configured for receiving the coolant after the heat has been removed from the water. The thruster may be, e.g., gas thruster, in which case, the coolant is conveyed to the gas thruster as a gas. Or the thruster may be, e.g., a bi-propellant thruster, in which case, the coolant may be hydrogen, and the bi-propellant thruster may be further configured for receiving oxygen.

In one embodiment, the coolant is a reactant, in which case, the spacecraft or aircraft further comprises a reactant distribution subsystem configured for conveying the reactant from the tank to the fuel cell as the first reactant, and further configured for conveying the reactant to the heat exchanger as the coolant. In another embodiment, the coolant stored in the tank is a cryogenic liquid (e.g., liquid hydrogen). In this case, the coolant that absorbs heat from the accumulated water may be boil off of the cryogenic liquid directly from the tank.

DRAWINGS

These and other features, aspects, and advantages of the present disclosure will become better understood with regard to the following description, appended claims, and accompanying drawings where:

DESCRIPTION

Figure 1A:
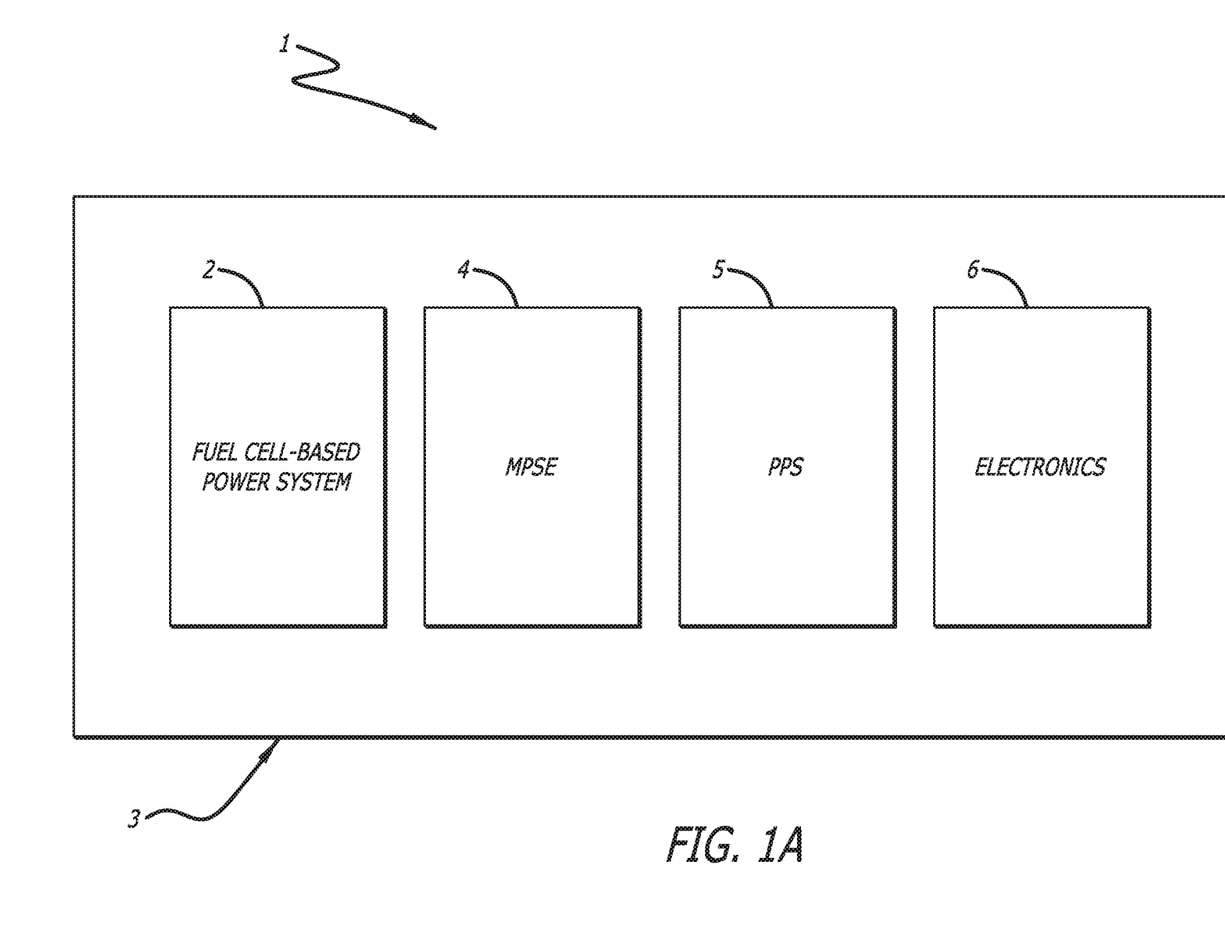
FIG. 1A is a block diagram of one embodiment of a spacecraft comprising the disclosed fuel cell-based power system in accordance with the present inventions.
Figure 1B:
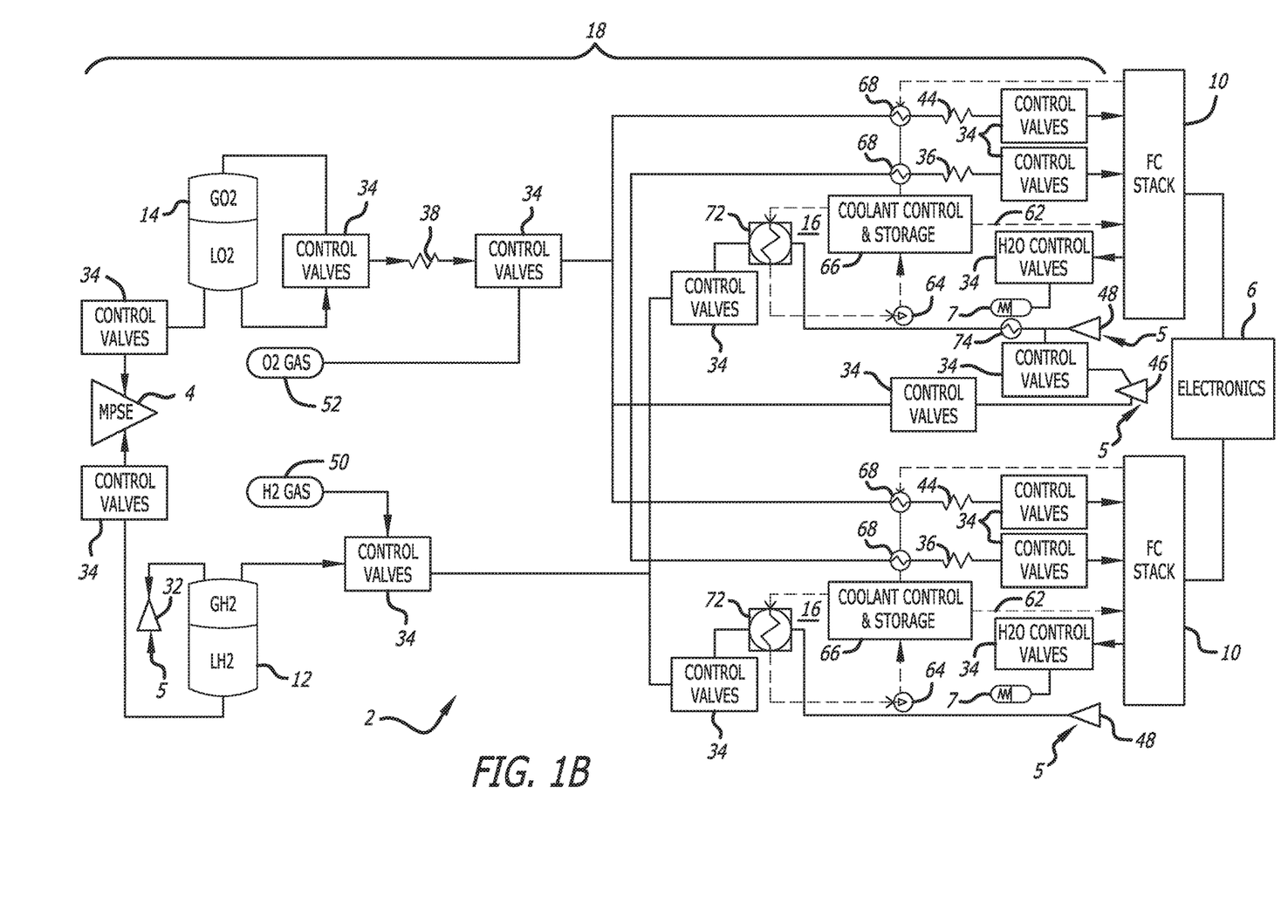
FIG. 1B is a plan view of one embodiment of fuel cell-based power system for use in a spacecraft constructed in accordance with the present inventions.

Referring to FIGS. 1A and 1B, a fuel cell-based power system 2 that can be used in a spacecraft 1 will now be described. The spacecraft 1 is designed to operate in outer space for any one or more of a variety of purposes, including communications, earth observations, meteorology, navigation, space colonization, planetary exploration, and transportation of humans and cargo. Although the fuel cell-based power system 2 is described herein as being used in a spacecraft 1, it should be appreciated that the fuel cell-based power system 2 can be used in other environments, such as in an aircraft or even a ground-based platform that requires electrical power.

The fuel cell-based power system 2 is incorporated into the structural bus 3 of the spacecraft 1 in a manner that operates in conjunction with other components of spacecraft 1, such as a main propulsion system engine (MPSE) 4 and a positioning propulsion system (PPS) 5, to power electronics 6 while at the same time saving weight for the spacecraft 1.

The fuel cell-based power system 2 comprises a plurality of conventional fuel cell stacks 10, which in the illustrated embodiment, numbers two, although any number of fuel cell stacks 10 can be utilized, including only one. Each of the fuel cell stacks 10 is configured for continuously receiving a flow of a first reactant (e.g., $H_2$) and a second reactant ($O_2$) to produce chemical reactions that generate electrical power, water, and heat. The electrical current is used to provide power to the electronics 6. The water created by the fuel cell stacks 10 must be evacuated from the fuel cell stacks 10 to maintain the efficiency thereof. The excess water may be advantageously conveyed via control valves 34 (such as check valves, isolation valves, or regulators) and stored in water accumulators 7 and used for consumption on-board the spacecraft 1. Thermally controlled heaters (not shown) may be used to prevent blockage otherwise caused by ice. The fuel cell-based power system 2 further comprises a first tank 12 configured for storing the first reactant, a second tank 14 configured for storing the second reactant, a coolant subsystem 16 configured for absorbing at least a portion of the generated heat from the fuel cell stacks 10, and a reactant distribution subsystem 18 configured for conveying the first and second reactants, under a suitable pressure and temperature, between the various components and systems of the spacecraft 1, including the fuel cell stacks 10, coolant subsystem 16, MPSE 4, and PPS 5. Thus, as will be described in further detail below, integrating the power system and propulsion systems of the spacecraft 1 improves its overall efficiency. The fuel cell-based power system 2 further comprises an electrical control unit (not shown) that is configured for monitoring and controlling the flow of reactants through the fuel cell stacks 10 and the temperature thereof.

As will also be described in further detail below, the reactants, and in the illustrated embodiment the $H_2$ and $O_2$, advantageously provide the duel function of providing fuel to the fuel cell stacks 10, as well as facilitating the cooling of the fuel cell stacks 10 by removing the excess heat generated by the fuel cells 10 and/or providing fuel to an independent system that performs a function different from the electrical power generation function or a cooling function. In the illustrated embodiment, the independent system is the MPSE 4 and/or the PPS 5. Moreover, although the heat generated by the fuel cell stacks 10 are generally vented off as waste in a conventional setting, as will be described in further detail below, the excess heat may be advantageously used to facilitate other functions of the spacecraft 1, including improving the efficiency of the PPS 5.

Figure 2:
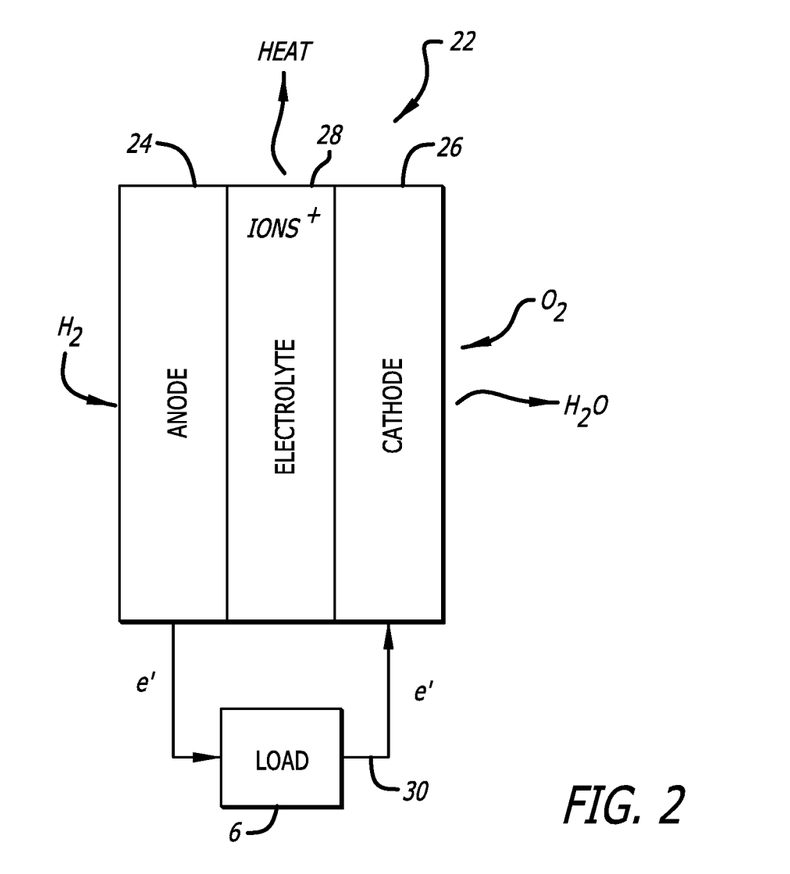
FIG. 2 is a plan view of one embodiment of a fuel cell that that can be used in the fuel cell-based power system of FIG. 1B.

Referring to FIG. 2, each of the fuel cell stacks 10 comprises one or more fuel cells 22, each of which comprises an anode 24, a cathode 26, an electrolyte 28 disposed therebetween, and a load path 30 connected between the anode 24 and cathode 26. Two chemical reactions occur in the fuel cell 22 at the interfaces of the anode 24, cathode 26, and electrolyte 28, with the net result being that the reactants are consumed, and water, electrical current, and excess heat are created. The anode 24 includes a catalyst, such as a platinum powder, that oxides the first reactant, and in this case $H_2$, turning the reactant into positively charged ions and negatively charged electrons. The electrolyte 28 is specifically designed to pass ions through it to the cathode 26, while preventing the freed electrons from passing through it to the cathode 26. Instead, the electrons travel through the load path 30, creating the electrical current that is used to supply the electronics 6 of the spacecraft 1. The ions combine with the electrodes at the cathode 26, and the two react with a cathode catalyst, such as nickel or nanomaterial-based catalyst, and second reactant, and in this case $O_2$, to create water. Although the illustrated embodiment describes a lower temperature polymer electrolyte membrane (PEM) fuel cell stack, other types of fuel cell stacks can be used.

A typical fuel cell produces a voltage from 0.6V to 0.9V at a full-rated load. To deliver the desired amount of energy, fuel cells 22 are combined in series in the respective stack 10 to yield a higher voltage, and in parallel to yield a higher current. For example, each fuel cell stack 10 may comprise forty fuel cells 22 that output power to a 28-volt DC bus. Manifolds (not shown) may run the length of the fuel cell stacks 10 and distribute the $H_2$, $O_2$, and coolant (described in further detail below) to the individual fuel cells 22. Further details discussing the structure and operation of the conventional fuel cells are described in https://en.wikipedia.org/wiki/Fuel_cell.

Referring back to FIG. 1B, the reactant distribution subsystem 18 is configured for conveying the first and second reactants respectively from the first and second tanks 12, 14 to the MPSE 4 via a series of control valves 34 as combustible reactants that are used by the thrusters (not shown) in the MPSE 4 in a conventional manner. However, the reactant distribution subsystem 18 is further configured for advantageously conveying the first and second reactants respectively from the first and second tanks 12, 14 to the fuel cell stacks 10.

In particular, the first and second reactants are stored in the respective first and second tanks 12, 14, cryogenic liquids, and in particular, liquid hydrogen (LH2) and liquid oxygen (LO2). Notably, in the extremely low pressure atmosphere of space, the first and second tanks 12, 14 may store the LH2 and LO2 at relatively low pressures to prevent extreme pressure differences between the tanks 12, 14 and the ambient environment.

With respect to the first tank 12, a portion of the LH2 may be boiled off to maintain desired cryogenic temperature and/or a low pressure differential between the first tank 12 and the ambient environment. Typically, all of the boiled off H2 would be vented into the ambient space environment with the recapture of some thrust from the flow being the only benefit. For example, the reactant distribution subsystem 18 may be configured for conveying the boiled off H2 to a thruster 32. However, the reactant distribution subsystem 18 conveys a portion of this boiled off H2 to the fuel cell stacks 10 as gaseous H2 via a series of control valves 34. The reactant distribution subsystem 18 further comprises heaters and/or a heat exchanger 36 that heat the gaseous H2 from a cryogenic temperature to a suitable temperature (e.g., 140° F.) suitable for efficient reactant use by the fuel cell stacks 10.

With respect to the second tank 14, the LO2, which has a higher thermal mass (i.e., the product of the LO2 loaded mass and specific heat) than LH2, need not be boiled off and vented to maintain the low pressure differential between the second tank 14 and the ambient environment. Instead, the reactant distribution subsystem 18 receives the LO2 directly from the second tank 14, and includes a heater or heat exchanger 38 that thermally transforms the LO2 into a vaporized or gaseous O2. Notably, a heater would normally have to be located within the second tank 14 to thermally transform the LO2 into a vaporized or gaseous O2 that is pressurized for passage through the reactant distribution subsystem 18 to the fuel cell stacks 10. However, the presence of the heater 38 external to the second tank 14 provides a more efficient means of heating the LO2 into a pressurized O2 vapor or gas, since the heater 38 need only operate on a relatively small amount of the LO2 at any given time. The reactant distribution subsystem 18 conveys a portion of the vaporized or gaseous O2 to the fuel cell stacks 10 via a series of control valves 34. The reactant distribution subsystem 18 further comprises heaters and/or heat exchangers 44 that heat the vaporized gaseous O2 from a cryogenic temperature to a suitable temperature (e.g., 140° F.) suitable for efficient use by the fuel cell stacks 10.

It should be appreciated that, although the reactant distribution subsystem 18 has been described as conveying the boiled off H2 from the first tank 12, the reactant distribution subsystem 18 may alternatively receive the LH2 directly from the first tank 12 and use a heater (not shown) to thermally transform the H2 into a vaporized or gaseous H2 much like the LO2 from the second tank 12 is transformed into a vaporized or gaseous O2.

The reactant distribution subsystem 18 is further configured for conveying the vaporized or gaseous H2 and O2 to the PPS 5. In particular, the PPS 5 comprises a bi-propellant combustion thruster 46 configured for combusting the mixture of the vaporized or gaseous H2 and O2 to produce a thrust that facilitates the positioning of the spacecraft 1, e.g., to maintain the LH2 and LO2 respectively in the aft portion of the tanks 12, 14 and/or to modify the orbital position of the spacecraft 1. The PPS 5 further comprises a pair of gas thrusters 48 configured for passing a gas to produce a thrust that also facilitates the positioning of the spacecraft 1.

The fuel-cell-based power system optionally comprises a first auxiliary tank 50 configured for storing high pressure gaseous hydrogen (GH2), and a second auxiliary tank 52 configured for storing high pressure gaseous oxygen (GO2). The reactant distribution subsystem 18 conveys the GH2 and GO2 from the respective auxiliary tanks 50, 52 to the fuel cell stacks 10 via a series of control valves 34. Advantageously, this can be accomplished in a relatively high pressure ambient environment, e.g., during a pre-launch sequence when the low pressure tanks 12, 14 cannot be effectively used at atmospheric pressure.

As briefly discussed above, the coolant subsystem 16 is configured for absorbing at least a portion of the generated heat from the fuel cell stacks 10. To this end, the coolant subsystem 16 comprises a plurality of coolant loops 62 and corresponding pumps 64, each of which circulates a primary coolant (e.g., water-glycol mixture) through a respective one of the fuel cell stacks 10, thereby removing waste heat from the fuel cell stacks 10. The coolant pump 64 and coolant control and storage valves 66 provides internal control of the circulating primary coolant to maintain the fuel cell stacks 10 at a normal operating temperature, e.g., 160° F.

The coolant subsystem 16 further comprises heat exchangers 68 that can inject the absorbed heat from the primary coolant circulating in the coolant loops 62 into the H2 and O2 reactants prior to their conveyance through the heaters 36, 44 and into the fuel cell stacks 10. As such, the reactants are pre-heated before they are further heated by the heaters 36, 44, thereby providing a more efficient heating process for the reactants, while advantageously removing heat from the primary coolant.

The reactant distribution subsystem 18 is configured for conveying one of the reactants, and in this case the vaporized or gaseous H2, as a secondary coolant to the coolant subsystem 16 via control valves 34 to remove at least a portion of the absorbed heat from the primary coolant flowing through the coolant loops 62. To this end, the coolant subsystem 16 further comprises a plurality of heat exchangers 72, each of which is configured for removing the absorbed heat from the primary coolant in the respective coolant loop 62 and injecting the removed absorbed heat into the secondary coolant (in this case H2) flowing through the reactant distribution subsystem 18. Significantly, the use of the reactant as the secondary coolant obviates the need for a relatively large and heavy radiator that would otherwise be used to radiate the excess heat from the primary coolant into the space ambient environment.

The coolant subsystem 16 is optionally configured for absorbing heat from the water in the accumulators 7, thereby freezing the water stored therein. The reactant distribution subsystem 18 may also be configured for conveying one of the reactants, and in this case the vaporized or gaseous H2, as a coolant to the water accumulators 7. To this end, the coolant subsystem 16 may further comprise a plurality of heat exchangers 74, which can be configured for removing the heat from the water accumulators 7 and injecting the removed heat into the secondary coolant (in this case H2) flowing through the reactant distribution subsystem 18. Significantly, the frozen water can be stored in the water accumulators 7 as a cold mass, so that it can be used as a heat sink later (for avionics, as well as for cooling the fuel cell stacks 10 after all of the LH2 has boiled off in the first tank 12) and it is retained for potential future use by astronauts in the case where the spacecraft 1 transports humans.

Moreover, the reactant distribution system 18 is configured for conveying the secondary coolant to the thrusters 46, 48 after the absorbed heat has been removed from the primary coolant. Advantageously, the heat injected into the secondary coolant from the heat exchangers 72, 74 increases the specific impulse ($I_{SP}$), and thus, the efficiency (more thrust for a given mass flow) of the thrusters 46, 48.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A fuel cell-based power system, comprising:
a fuel cell configured for continuously receiving a first reactant and a second reactant to produce chemical reactions that generate electrical power, water, and heat;
a first tank configured for storing the first reactant;
a second tank configured for storing the second reactant;
a coolant subsystem configured for circulating a primary coolant in association with the fuel cell, thereby absorbing at least a portion of the heat generated from the fuel cell,
wherein the coolant subsystem comprises a primary heat exchanger configured for injecting absorbed heat from the primary coolant into a secondary coolant, and secondary heat exchangers configured for injecting absorbed heat from the primary coolant into the first reactant and the second reactant; and
a reactant distribution subsystem configured for conveying the first reactant from the first tank and the second reactant from the second tank to the fuel cell, for conveying at least one of the first reactant from the first tank or the second reactant from the second tank to an independent system, and for conveying the first reactant from the first tank to the coolant subsystem as the secondary coolant to remove the at least a portion of the heat absorbed by the primary coolant,
wherein the independent system is configured for performing a function, which is different from an electrical power generation function or a cooling function.

2. The fuel cell-based power system of claim 1, wherein the first reactant is hydrogen and the second reactant is oxygen.

3. The fuel cell-based power system of claim 2, wherein the reactant distribution subsystem is configured for conveying the first reactant from the first tank to the fuel cell as gaseous hydrogen, and for conveying the second reactant from the second tank to the fuel cell as gaseous oxygen.

4. The fuel cell-based power system of claim 1, wherein the reactant distribution subsystem is configured for conveying the first reactant to a thruster after the at least a portion of the heat has been removed from the primary coolant.

5. The fuel cell-based power system of claim 1, wherein the first reactant is stored in the first tank as a cryogenic liquid, and the second reactant is stored in the second tank as a cryogenic liquid.

6. The fuel cell-based power system of claim 5, wherein the reactant distribution subsystem is configured for receiving boil off of the cryogenic liquid directly from the first tank.

7. The fuel cell-based power system of claim 6, wherein the cryogenic liquid in the first tank is liquid hydrogen.

8. The fuel cell-based power system of claim 6, further comprising an auxiliary tank configured for storing a gaseous reactant,
wherein the reactant distribution subsystem is configured for selectively conveying the boil off of the cryogenic liquid from the first tank to the fuel cell or the gaseous reactant from the auxiliary tank to the fuel cell.

9. The fuel cell-based power system of claim 5, further comprising a tertiary heat exchanger configured for thermally transforming the cryogenic liquid from the second tank into a vapor or gas.

10. The fuel cell-based power system of claim 9, wherein the cryogenic liquid in the second tank is liquid oxygen.

11. The fuel cell-based power system of claim 9, further comprising an auxiliary tank configured for storing a gaseous reactant,
wherein the reactant distribution subsystem is configured for selectively conveying the vapor or gas from the tertiary heat exchanger to the fuel cell or the gaseous reactant from the auxiliary tank to the fuel cell.

12. A spacecraft or aircraft, comprising:
an independent system configured for performing a function different from an electrical power generation function or a cooling function;
a fuel cell-based power system comprising a fuel cell, a first tank, a second tank, a reactant distribution subsystem, and a coolant subsystem comprising a primary heat exchanger and secondary heat exchangers,
wherein the fuel cell is configured for continuously receiving a first reactant and a second reactant to produce chemical reactions that generate electrical power, water, and heat, the first tank is configured for storing the first reactant, the second tank is configured for storing the second reactant, the coolant subsystem is configured for circulating a primary coolant in association with the fuel cell, thereby absorbing at least a portion of the heat generated from the fuel cell, the primary heat exchanger is configured for injecting absorbed heat from the primary coolant into a secondary coolant, the secondary heat exchangers are configured for injecting absorbed heat from the primary coolant into the first reactant and the second reactant, and the reactant distribution subsystem is configured for conveying the first reactant from the first tank and the second reactant from the second tank to the fuel cell, for conveying at least one of the first reactant from the first tank or the second reactant from the second tank to the independent system to perform the function, and for conveying the first reactant from the first tank to the coolant subsystem as the secondary coolant to remove the at least a portion of the heat absorbed by the primary coolant;
electronics configured to receive the electrical power generated by the fuel cell-based power system; and
a structural bus comprising the independent system, the fuel cell-based power system, and the electronics.

13. The spacecraft or aircraft of claim 12, wherein the independent system is a main propulsion system engine (MPSE).

14. The spacecraft or aircraft of claim 12, wherein the independent system is a positioning propulsion system.

15. The spacecraft or aircraft of claim 12, wherein the reactant distribution subsystem is configured for conveying the first reactant to a thruster after the at least a portion of the heat has been removed from the primary coolant.

16. A method of operating the spacecraft or aircraft of claim 12, the method comprising:
performing the independent function different from the electrical power generation function or the cooling function;

continuously conveying the first reactant and the second reactant to the fuel cell to produce chemical reactions that generate electrical power, water, and heat;

circulating the primary coolant in association with the fuel cell, thereby absorbing the at least a portion of the heat generated from the fuel cell;

storing the first reactant and the second reactant;

conveying at least one of the first reactant or the second reactant to perform the independent function;

utilizing the first reactant as the secondary coolant to remove the at least a portion of the heat absorbed by the primary coolant; and supplying the electronics with the electrical power generated by the fuel cell.

17. The method of claim 16, wherein the independent function is providing main propulsion for the spacecraft or aircraft.

18. The method of claim 16, wherein the independent function is positioning the spacecraft or aircraft.

19. The method of claim 16, wherein the method further comprises conveying the first reactant to a thruster after the at least a portion of the heat has been removed from the primary coolant.

20. The method of claim 16 used to operate the spacecraft in space.

* * * * *